United States Patent [19]

Eckstein

[11] Patent Number: 4,551,371
[45] Date of Patent: * Nov. 5, 1985

[54] MULTIPLE LAYER FLEXIBLE SHEET STRUCTURE

[75] Inventor: John P. Eckstein, Neenah, Wis.

[73] Assignee: American Can Company, Greenwich, Conn.

[*] Notice: The portion of the term of this patent subsequent to Dec. 6, 2000 has been disclaimed.

[21] Appl. No.: 535,935

[22] Filed: Nov. 4, 1983

Related U.S. Application Data

[63] Continuation of Ser. No. 306,675, Sep. 29, 1981, Pat. No. 4,418,841.

[51] Int. Cl.[4] ............... B65D 35/08; B32B 15/08; B32B 27/08
[52] U.S. Cl. .................................. 428/36; 428/515; 428/520; 428/463; 428/513; 222/107
[58] Field of Search ............ 428/36, 215, 515, 520, 428/463, 513; 222/106, 107

[56] References Cited

U.S. PATENT DOCUMENTS 3,956,544  5/1976  Harrington .................. 222/107
4,257,536  3/1981  Hilmar ........................ 222/107

Primary Examiner—John E. Kittle
Assistant Examiner—James J. Seidleck
Attorney, Agent, or Firm—Stuart S. Bowie; Douglas W. Wyatt

[57] ABSTRACT

A multiple layer polymeric-based sheet structure is suitable for forming dispensing tubes. The abuse resistance of the tube is improved by incorporating in the sheet structure a layer of oriented polypropylene. A layer of linear low density polyethylene provides for heat sealing and has substantially improved stress crack resistance and resistance to generation of polydust.

20 Claims, 5 Drawing Figures

MULTIPLE LAYER FLEXIBLE SHEET STRUCTURE

This is a continuation of application Ser. No. 306,675, filed Sept. 29, 1981, now U.S. Pat. No. 4,418,841.

BACKGROUND OF THE INVENTION

This invention pertains to multiple layer flexible sheet structures and the use of those sheet structures in flexible tubes of the type commonly used for packaging paste type products. Thick metal foil as a single layer has long been used to hold and dispense paste type products. However, metal tubes have definite shortcomings. Compared to other tube structures, metal tubes are very expensive, they dent easily and they tend to crack with a moderate amount of flexing.

More recently, a large share of the tube market has been taken by flexible sheet materials having a multiplicity of polymeric layers. Typical tubes have an inner heat sealable layer, an outer heat sealable layer, and a barrier layer interposed therebetween. Additional layers may further be used in conventional structures to provide other properties or qualities.

Layers of a non-polymeric nature, such as paper and thin metal foils may also be included in these sheet materials to provide specialized performance functions.

It is known, for example, to provide a layer of thin aluminum foil as a high quality barrier layer. When foil is used, it is common practice to use a highly adhesive polymer to adhere it to its adjacent layers.

It is also known to provide a layer of paper, which may provide dimensional stability, and also provide an aesthetically pleasing and aseptically clean appearing white background.

While known structures have experienced success in the commercial market place, there has been a certain degree of failure with existing tube structures; and certain products are so hard to hold that no polymeric tube structure has been acceptable for packaging them.

A particular problem of tube failure is attributed to failure of the tubes due to rough handling during shipping, wherein the tube sidewall splits, allowing the contents to ooze out.

Another problem is associated with chemical activity of product held in tubes having a layer of aluminum foil. The polymer between the foil and the product may develop small cracks known as stress cracks, due to chemical attack by the contained product. Stress cracks then allow the product to penetrate the polymer and either attack the foil, causing loss of adhesion between the foil and the adjoining layers; or the product may attack the interfacial bond between polymer layers thus causing loss of adhesion between these polymer layers. In either case, failure of the bond results in premature failure of the tube.

In addressing the stress crack problem, it is known to use a thick layer of ethylene acrylic acid (EAA) as the product contacting surface. While EAA does have substantial stress crack resistance, it is relatively expensive, and it is highly desirable to find a cheaper replacement material. Further, small particles of EAA are rubbed off its surface by the processing equipment during tube processing. These particles, known as polydust, are sometimes picked up by tubes, and may even become entrapped in the tube. While materials used for contact with hygenic products are preferrably acceptable for contact with the product, it is highly desired to avoid inclusion of any type of contamination into the product.

Thus it is desirable to find a material which has good stress crack resistance and also does not generate polydust in the processing equipment.

The ability of a tube to withstand rough handling is related to its ability to withstand a drop test described hereinafter as a tube drop test, in which a tube filled with product is repeatedly dropped until the tube fails. All tubes shipped in commerce may be expected to be subjected to rough handling, essentially independent of the product contained and are thus subject to handling stress as exemplified in the tube drop test. Economic construction of tubes consistently capable of passing the drop test has remained a problem.

While numerous attempts have been made in the packaging industry to resolve these problems in tube construction, and while certain polymers and, in particular polyethylenes, have been offered to the packaging industry with suggestions of improved stress crack resistance, the problems of stress crack resistance and tube sidewall strength have remained unresolved. Thus it remained for the inventor to resolve these problems by designing improved sheet structures, and tubes made therefrom, after extensive testing of many alternative structures.

SUMMARY OF THE INVENTION

Surprising improvements have been found in a multiple layer sheet structure wherein the layers are firmly adhered to each other to make a unitary structure and comprise, in order, a heat sealable layer, a first adhesive layer, a barrier layer, a second adhesive layer, a layer of oriented polypropylene (OPP), and a polyethylene layer.

The OPP layer is at least 0.65 mil thick and preferrably between about 0.9 to 2.0 mils thick, the polyethylene layer being about 0.7 to 3.0 mils thick. The sheet structure may have, on the polyethylene layer, additional layers of, in order, a paper layer, a second polyethylene layer, and an exterior layer, the exterior layer being bonded to the second polyethylene layer with good adhesion, and being heat sealable to the heat sealable layer, which is LLDPE. LLDPE is used collectively herein to refer to linear low density polyethylene, both homopolymers and copolymers, and should be interpreted as such throughout the writing.

Preferrably, the LLDPE layer is 0.7 to 3.0 mils thick, the foil is 0.35 to 0.7 mil thick, the oriented layer is 0.9 to 2.0 mils thick, the first polyethylene layer is 0.7 to 3.0 mils thick, and the sum of the thicknesses of the second polyethylene layer and the exterior layer combined is about 2.0 to 5.0 mils.

In a most preferred sheet structure, the LLDPE layer is about 1.2 mils thick, the foil is 0.35 mil thick and the OPP layer is about 1 mil thick. In further description of the preferred structure, the sum of the thicknesses of the LLDPE layer and the first adhesive layer is 2.0 to 5.0 mils.

Another preferred structure is one wherein the layers comprise, in order, a layer of LLDPE, a first adhesive layer, a metal foil layer, a second adhesive layer, and a polyethylene layer.

The first and second adhesive layers are effective to join the foil to the polyethylene and LLDPE layers, and the layer thicknesses are similar to those described for the preceding structure. In some embodiments the second adhesive layer and the first polyethylene layer contain ethylene methyl acrylate copolymer (EMA) as a blend component.

The invention is further, and preferably, exemplified in a flexible dispensing tube made of multiple layer sheet material wherein the layers are firmly adhered to each other to make a unitary structure, the sheet material comprising consecutive layers of, in order, a first heat sealable polymer layer, a first adhesive layer, a metal foil layer, a second adhesive layer, an OPP layer, a third adhesive layer, a paper layer, and a second heat sealable polymer layer. The first heat sealable polymer layer is preferably LLDPE.

In a most preferred tube structure, there is an exterior layer of polyethylene on the second heat sealable polymer layer, and an additional polymeric layer between the paper layer and the second heat sealable layer. Preferred layer structure includes: for the LLDPE layer 0.7 to 3.0 mils thick; for the foil 0.35 to 0.7 mil thick, for the oriented layer, 0.9 to 2.0 mils thick, for the third adhesive layer, a layer of polyethylene about 0.7 to 2.0 mils thick, and for the sum of thicknesses of the second heat sealable layer and the additional layer, about 2.0 to 5.0 mils. Further, the sum of the thicknesses of the LLDPE layer and the first adhesive layer is 2.0 to 5.0 mils.

DETAILED DESCRIPTION OF THE PREFERRED EMBODIMENTS

Figure 1:
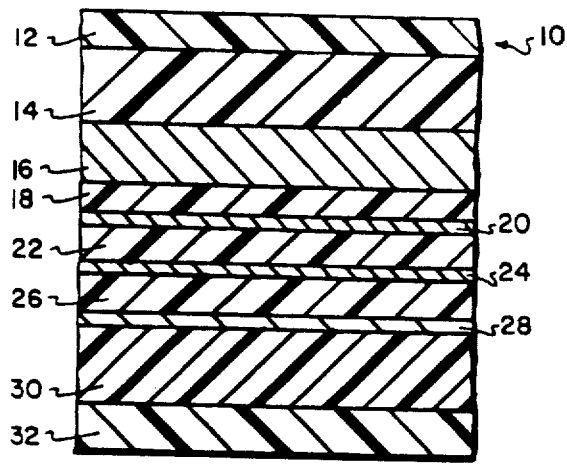
FIG. 1 is a cross-section of one embodiment of multiple layer sheet structure of this invention.

Turning now to FIG. 1, the numeral 10 designates the entire multiple layer sheet structure cross-section. Layers 12, 14, 18 and 32 are low density polyethylene (LDPE). Layer 16 is paper. Layer 22 is OPP. Layers 26 and 30 are EAA. Layer 28 is aluminum foil. Layers 20 and 24 are polyethylene imine primer (PEI).

Beginning on the surface of the structure 10, the first layer 12 is LDPE. The second layer 14 is LDPE blended with a coloring pigment. The third layer 16 is paper. The fourth layer 18 is LDPE which, as will be seen later is used as an adhesive layer. Layer 18 is made effective as an adhesive to layer 22, OPP, through the use of a primer coating 20 of PEI. Layer 22 is also effectively adhered to the next adhesive layer 26, an EAA copolymer, through the use of a PEI primer coating 24. Adhesive layer 26 adheres layer 22 to the next layer 28, metal foil, preferably aluminum foil. Layer 30 is EAA, and effectively adheres layer 32, LDPE to the foil.

Layers 12 and 14 combined act as heat seal layers in forming the joint on the tube sidewall, wherein a portion of the surface of layer 12 is sealed against a portion of the surface of layer 32 to form a lap seal. Likewise, layer 30 is effectively used as a portion of the heat seal on that side of the sheet structure such that layers 30 and 32 co-act cooperatively, as necessary, to form the heat seal. Layer 30 also serves as a barrier between the foil layer 28 and the product 37, to protect the foil from chemical attack by the product. Paper layer 16 serves the known function of providing properties of dimensional stability to the structure. The layer 28 of aluminum foil serves as a barrier to transmission of gases, and any light which may penetrate layers 14 and 16. The aluminum foil further serves, in combination with the paper layer 16, to provide dimensional stability to the structure.

Layer 22 is oriented polypropylene, homopolymer or copolymer, hereinafter referred to collectively as OPP, adhered to adjacent adhesive layers 18 and 26 of LDPE and EAA respectively through layers 20 and 24 of PEI primer. While it is shown separately for illustration purposes, the PEI primer is, or course, considered part of the adhesive layer, such as layer 18 of 26. The OPP layer may be either a single layer, or may alternately consist of multiple layers comprising the recited and illustrated layer 22, so long as the functional properties are as described. The OPP serves the function of strengthening the sheet structure such that tubes, such as 34, made from sheet structure 10 can withstand more physical shock-type abuse than structures heretofore known, such as the prior art structure shown in FIG. 4. In order for the OPP layer 22 to perform its shock resistance function, it must meet two specific criteria in its incorporation into the structure. First the OPP layer must be a minimum of 0.65 mil thick in order to exhibit enough strength in the structure to provide a significant strength improvement. Desirably, it is 0.9 to 1.0 mil thick, although the 0.65 thickness does demonstrate improvement. Secondly, the OPP must be firmly adhered to the adjacent layers 18 and 26. It has, for example, been found that structure similar to structure 10 of FIG. 1, but omitting primer layers 20 and 24, has less resistance to certain shock loads than does the prior art structure of FIG. 4. Analysis showed about 30 grams of adhesion between the OPP and the adjacent layers of LDPE and EAA. See structure A-1 in Table 1. In the adhesion test a one inch strip of the structure is peeled at the appropriate layer interface on an Instron Tensile Tester at 10 inches per minute crossing speed. The Instron Tester is from Instron Corporation, Canton, Mass. Improved structures of the invention generally have adhesion values of 100 grams per inch or more and certain structures have 200 to 400 grams per inch, with some structures being even higher. Tests have been successfully completed with tubes of the invention wherein the adhesion values were as low as 54 grams per inch. Thus the adhesion between the OPP and the adjacent layers must be at least about 54 grams per inch, and is preferably at least 100 grams.

Figure 2:
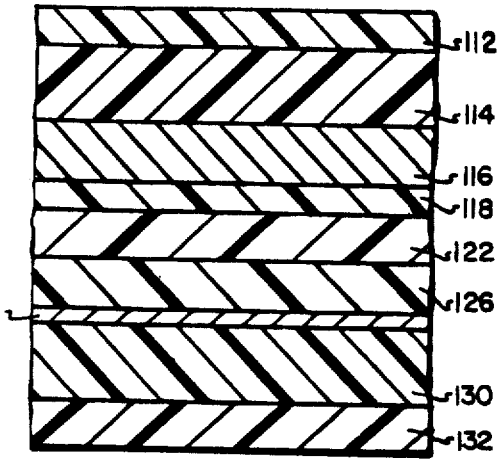
FIG. 2 is a cross-section of another embodiment of multiple layer sheet structure of this invention.

In another embodiment of the invention, shown in FIG. 2, adhesive layers 118 and 126, corresponding to layers 18 and 26 of FIG. 1, are used without the PEI primer, and function effectively to bond the OPP layer 122 to the adjacent layers. Layers 118 and 126 are modified from layers 18 and 26 of FIG. 1 by blending 20% to 100% ethylene methyl acrylate copolymer (EMA) into the 118 and 126 layers. (While a 100% blend is pure EMA, it is intended to be included herein in the blend description.) The EMA blends, then, provide effective adhesion between the OPP and the adjacent layers.

In further examination of the shock resistance of tubes of this invention, it is submitted that certain structures of the prior art achieved a limited degree of success by incorporating up to 3.0 mils or more of aluminum foil into, for example, layer 28. While such structures exhibit the desired shock resistance, they suffer other problems. For example, three mils of foil is substantially more expensive than 0.35 mil, with the foil being one of the more expensive components of the structure, anyway. In processing the structure into tubes and forming the side seam, structures having the thick foil, such as 2 or 3 mils, tend to generate foil slivers during the side-seaming operation. Further, such tubes may exhibit satisfactory properties when produced; but fail during use, wherein the layers may partially separate when the tube is rolled up then unrolled.

Structures of the invention, such as in FIGS. 1 and 2, may be easily formed into tubes, filled, and sealed on conventional equipment using conventional processes. As will be seen in disclosure hereinafter of test data, a structure of FIG. 1, 11.0 mils thick has substantially improved shock resistance as compared to a prior art structure of FIG. 4 which is 13.0 mils thick and is further illustrated as Prior Art Structure A in Table 1. In the process, the amount of foil has advantageously been reduced by 0.35 mil, LDPE has been reduced by 0.35 mil, and EAA has been reduced to 2.3 mils. Thus the overall material savings is substantial.

In a further improvement provided by this invention, layer 32 of FIG. 1, and correspondingly layer 132 of FIG. 2, is composed of LLDPE rather than LDPE. This improvement concerns the protection of foil layer 28 and its adhesion at the interface with layer 30, and also protection of the interfacial adhesion between layers 30 and 32.

Figure 4:
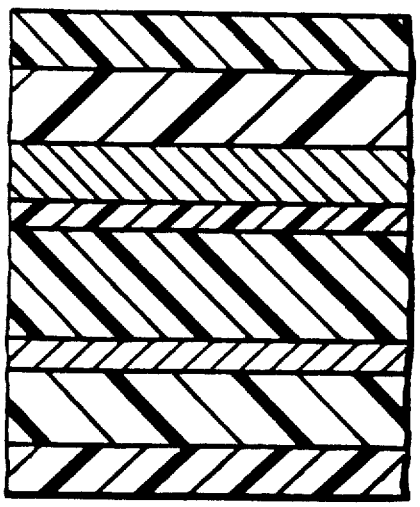
FIG. 4 is a cross-section of a prior art sheet structure.
Figure 5:
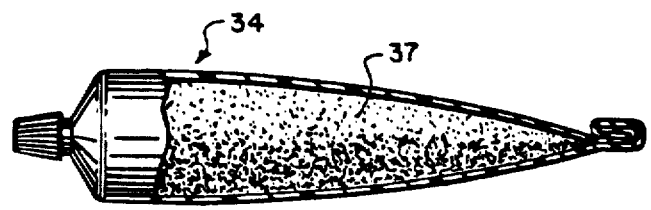
FIG. 5 is a partially cut away view of a product-containing tube made with sheet structure of this invention.

It is normal practice, such as in the prior art of FIG. 4, to provide 2.0 mils of EAA and 1.2 mil LDPE. Such structure is vulnerable to attack by certain chemical products to be contained in the tubes, and fails to contain the product by failure known as stress cracking; wherein, under physical stress and the presence of certain chemical products, the LDPE layer forms minute cracks. These cracks allow the chemical product to effectively penetrate the LDPE layer, and may permeate through the EAA layer. Product permeation of the EAA layer facilitates attack of the inter layer adhesion between the EAA and the foil. The typical result is loosening of the adhesion at the interface of the foil and EAA layers and, sometimes, visible corrosion of the foil layer. Once the adhesion is loosened, the unitary nature of the multiple layer structure is destroyed and the structure is unable to properly perform its function.

In an attempt to achieve improved stress crack resistance, the prior art has substituted EAA into layer 32 in place of the LDPE. This substitution has been partially successful, but at the substantially increased cost of additional expensive EAA. Functionally, however, the EAA surface is susceptible to scuffing, and thus must be handled very carefully, which is undesirable in commercial manufacturing operations. Surprisingly, the substitution of low-cost LLDPE for LDPE results in substantially improved stress crack resistance—to a level at least as good as EAA.

Figure 3:
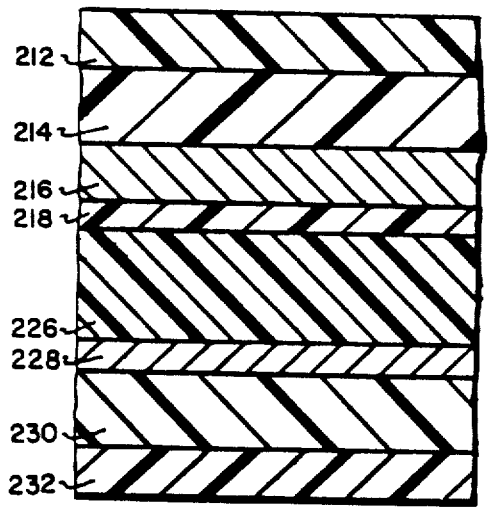
FIG. 3 is a cross-section of still another embodiment of multiple layer sheet structure of this invention.

For use in tubes requiring good stress crack resistance, but not necessarily requiring maximum shock resistance, the OPP of layer 22 and primer layers 20 and 24 may be omitted, yielding the structure shown in FIG. 3, wherein layers similar to those of FIG. 1 are given like numbers of the 200 series.

It should be appreciated that the outer layers of the tube, represented, for example, in FIG. 1 by layers 12 and 14, may be selected from those materials which are compatible with layers 30 and 32. Examples of acceptable materials are LDPE, LLDPE, EAA, EMA, medium density polyethylene (MDPE), high density polyethylene (HDPE) and ethylene vinyl acetate (EVA).

EXAMPLE 1

In making multiple layer sheet structure of this invention, two mils of pigmented LDPE was extrusion coated onto 1.6 mils of paper. A sheet of one mil OPP was coated with PEI primer on one of its surfaces, and the coating dried. The primer surface of the OPP was extrusion laminated to the uncoated surface of the paper using 0.7 mil LDPE laminant; and the coated side of the paper was overcoated with an extrusion coating of 1.15 mils of LDPE. The exposed surface of the OPP was coated with PEI primer and the primer dried. The primed surface was extrusion laminated to a first surface of 0.35 mil aluminum foil, using 1.0 mil of EAA as the laminant. Finally, the second surface of the foil was coextrusion coated with 2.0 mils of EAA and 1.2 mils LDPE, the EAA being adjacent the foil. The resulting multiple layer structure was 11.0 mils thick, and was as shown in FIG. 1.

EXAMPLE 2

A sheet structure was made as in Example 1 except that the OPP was not primed on either of its surfaces. Rather the extrusion laminants, as in FIGS. 118 and 126 of FIG. 2, contained EMA. Layer 118 was 100% EMA. Layer 126 was a blend of 75% EMA and 25% EAA. The 1.2 mil surface layer, as in layer 32 of FIG. 1 was LLDPE.

EXAMPLE 3

Two mils of pigmented LDPE was extrusion coated onto 1.6 mils of paper. The uncoated surface of the paper was extrusion coated using 0.7 mil LDPE; and the pigmented LDPE-coated surface of the paper was over-coated, by extrusion coating, with 1.5 mils LDPE. 0.7 mil aluminum foil was extrusion laminated to the 0.7 mil LDPE with 3.3 mils EAA. Finally 2.0 mils EAA and 1.2 mil LLDPE were coextrusion coated onto the exposed foil surface, with the EAA adjacent the foil. The resulting sheet structure was 13.0 mils thick.

EXAMPLES 1–9

Additional structures, are shown in the following Table 1.

TABLE 1

| Example 1 | Example 2 | Example 3 |
|---|---|---|
| 1.15 mil LDPE | 1.15 mil LDPE | 1.5 mil LDPE |
| 2.0 mil Pigmented LDPE | 2.0 mil Pigmented LDPE | 2.0 mil Pigmented LDPE |
| 1.6 mil Paper | 1.6 mil Paper | 1.6 mil Paper |
| 0.7 mil LDPE | 0.7 mil EMA | 0.7 mil LDPE |
| PEI primer | 1.0 mil OPP | 3.3 mil EAA |
| 1.0 mil OPP | 1.0 mil EMA/EAA Blend | 0.7 mil Foil |
| PEI primer | 0.35 mil Foil | 2.0 mil EAA |
| 1.0 mil EAA | 2.0 mil EAA | 1.2 mil LDPE |
| 0.35 mil Foil | 1.2 mil EDPE | 13.0 mil Total |

TABLE 1-continued

| | | |
|---|---|---|
| 2.0 mil EAA | 11.0 mil Total | |
| 1.2 mil LDPE | | |
| 11.0 mil Total | | |

| Example 4 | Example 5 | Example 6 |
|---|---|---|
| 1.5 mil LDPE | 1.15 mil LDPE | 1.15 mil LDPE |
| 2.0 mil Pigmanted LDPE | 2.0 mil Pigmented LDPE | 2.0 mil Pigmented LDPE |
| 1.6 mil Paper | 1.6 mil Paper | 1.6 mil Paper |
| 2.0 mil LDPE | 0.7 mil LDPE | 0.7 mil LDPE |
| PEI primer | PEI primer | PEI primer |
| 1.0 mil CPP | 0.5 mil OPP | .75 mil OPP |
| PEI primer | PEI primer | PEI primer |
| 1.0 mil EAA | 1.0 mil EAA | 1.0 mil EAA |
| 0.7 mil Foil | .35 mil Foil | .35 mil Foil |
| 3.2 mil EAA | 2.0 mil EAA | 2.0 mil EAA |
| 13.0 mil Total | 1.2 mil LDPE | 1.2 mil LDPE |
| | 10.5 mil Total | 10.75 mil Total |

| Example 7 | Example 8 | Example 9 |
|---|---|---|
| 1.15 mil LDPE | 1.15 mil LDPE | 1.15 mil LDPE |
| 2.0 mil Pigmented LDPE | 2.0 mil Pigmented LDPE | 2.0 mil Pigmented LDPE |
| 1.6 mil Paper | 1.6 mil Paper | 1.6 mil Paper |
| .7 mil LDPE | 0.7 mil LDPE | 0.7 mil LDPE |
| PEI primer | PEI primer | PEI primer |
| .65 mil OPP | 0.9 mil OPP | 1.0 mil OPP |
| PEI primer | PEI primer | PEI primer |
| 1.0 mil EAA | 1.0 mil EAA | 3.3 mil EAA |
| .35 mil Foil | .35 mil Foil | 0.7 mil Foil |
| 2.0 mil EAA | 2.0 mil EAA | 2.0 mil EAA |
| 1.2 mil LDPE | 1.2 mil LDPE | 2.5 mil LDPE |
| 10.65 mil Total | 10.9 mil Total | 14.95 mil Total |

| Prior Art A | Prior Art A-1 |
|---|---|
| 1.5 mil LDPE | 1.5 mil LDPE |
| 2.0 mil Pigmented LDPE | 2.0 mil Pigmented LDPE |
| 1.6 mil Paper | 1.6 mil Paper |
| 0.7 mil LDPE | 2.0 mil LDPE |
| 3.3 mil EAA | 1.0 mil OPP |
| 0.7 mil Foil | 1.0 mil EAA |
| 2.0 mil EAA | 0.7 mil Foil |
| 1.2 mil LDPE | 2.0 mil EAA |
| 13.0 mil Total | 1.2 mil LDPE |
| | 13.0 mil Total |

The sheet materials shown in the Examples were made into dispensing tubes in known manner. That is, tubes were formed by forming a longitudinal lap seam by heat sealing techniques to form tubes 1 11/32 inches diameter. The tubes were then cut to length and heads were injection molded into one end, including the use of conventional inserts, and capped. The tubes were filled with product and the ends sealed. The filled tubes were then subjected to testing to demonstrate their strengths, both immediately and after predetermined agings.

DROP TESTS

There were two drop test procedures, performed with tubes filled with toothpaste. In the head drop test, a tube was dropped on its capped head from a height of 4 feet onto a hard surface. The same tube was repeatedly dropped until it failed, with a maximum of 11 drops per tube, 3 tubes per variable.

In the side drop test, a tube was dropped on its side from a height of 4 feet onto a hard surface. The same tube was repeatedly dropped until it failed, with a maximum of 11 drops per tube, 3 tubes per variable.

In evaluating the tubes according to the drop tests, each drop was counted as one point. Thus each tube could contribute a maximum of 11 points to the evaluation, and with a total of 6 tubes per example, the maximum possible score for each example is 66 points. Where more than 6 tubes were tested the data in Table 2 represent the average 6-tube results.

Drop tests were performed immediately after filling, and again after accelerated aging. The tests immediately after filling represent the best results to be expected during the life cycle of the package. The accelerated aging, on the other hand, caused significant increase in the fluidity of the product, so that it was a dense fluid, rather than a paste. Thus the drop tests after aging subjected the tubes to substantially higher hydraulic shocks, and represent the extreme case of physical abuse.

Table 2 clearly shows that tubes made from structures of this invention are substantially stronger than tubes made from the Prior Art A structure. It should be noted here that Example 5 has been included to show the criticality of the thickness of the OPP layer. It is seen that the Example 5 structure, with 0.5 mil OPP is no better than the Prior Art "A" structure in the Head Drop test; whereas Examples 6 and 7, with 0.75 and 0.65 mil OPP, respectively, show some improvement, even under the severe test conditions of the aged structures; while the Examples having at least 0.9 mil OPP gave the best results.

It is signficiant to note that, under the test procedure described, the entry of a numeral 3 score indicates that 3 tubes were dropped once, and all 3 tubes failed to survive the first drop. Thus the "A" structure did not survive any of the head drop tests, not even right after filling. Neither did the Example 5 structure survive any drops; but the structures of the invention did.

TABLE 2

| Example No. | Test Drops | | | | | |
|---|---|---|---|---|---|---|
| | Immediate | | | Aged 14 Days, 120° F. | | |
| | Side Drop | Head Drop | Total | Side Drop | Head Drop | Total |
| Prior Art A | 16 | 3 | 19 | 13 | 3 | 16 |
| 1 | 32.5 | 33 | 65.5 | 28 | 32.5 | 60.5 |
| 2 | 25.5 | 33 | 58.5 | 18 | 32 | 50 |
| 3 | | | N/D | | | N/D |
| 4 | | | N/D | | | N/D |
| 5 | 19 | 3 | 22 | 15 | 3 | 18 |
| 6 | 33 | 19 | 52 | 16 | 5 | 21 |
| 7 | 23 | 20 | 43 | 12 | 7 | 19 |
| 8 | 28 | 33 | 61 | 24 | 33 | 57 |
| 9 | 33 | 33 | 66 | 33* | 33* | 66* |

*aged 1 month, 75° F.
N/D = no data

STRESS CRACK TESTS

In evaluating stress crack resistance, experimental structures were compared to the Prior Art A structure and to new Prior Art structres B and C.

| Prior Art B | Prior Art C |
|---|---|
| 1.5 mil LDPE | 1.5 mil LDPE |
| 2.0 mil Pigmented LDPE | 2.0 mil Pigmented LDPE |
| 1.6 mil Paper | 1.6 mil Paper |
| 0.7 mil LDPE | 0.7 mil LDPE |
| 3.3 mil EAA | 3.3 mil EAA |
| 0.7 mil Foil | 0.7 mil Foil |
| 3.2 mil EAA | 1.0 mil EAA |
| 13.0 mil Total | 2.2 mil EAA |
| | 13.0 mil Total |

In one stress crack test, tubes from Example 3 and Prior Art structure A were filled with mineral spirits. Duplicate sets of samples were stored in 2 trials at 120° F. and 140° F. Stress crack failures appeared in the "A" tubes of both sets after 5 days, while the Example 3 tubes showed no failure after 1 month.

In another stress crack test of Example 3 and structure "A," tubes were filled with toothpaste and stored at 120° F. After one month, the tubes were squeezed to compare seal integrity; with the prior art tubes failing at lower squeezing pressures than Example 3 tubes.

In still another stress crack test of Example 3 against Prior Art Structures A, B and C, tubes were filled with mineral spirits and stored flat. Duplicate sets of each variable were stored in two trials at 120° F. and 140° F. Within one week stress cracks appeared in variables A and C. There were none in variable B or Example 3. The remaining samples were squeeze tested. Example 3 and variable C were judged equal. Variable B was better; variable A was the worst.

In a processing test, variable B and Example 3 were subjected to higher than normal down pressure on commercial side seaming equipment to demonstrate susceptibility to generation of polydust. Polymer dust did accumulate during running of variable B, indicating a polydust problem. No polydust was observed during the similar comparative running of Example 3 tubes.

From the above testing of Example 3 tubes against prior art variables it was concluded that the use of LLDPE as the sealant layer provides improved stress crack resistance over LDPE (variable A); its stress crack resistance is equal to EAA (variables B and C); and it is not susceptible to generation of polydust by processing equipment as is EAA (variable B trial).

In tube structures benefiting from the improved shock resistance imparted by the incorporation of OPP, the sealant layer may be chosen from a selection of heat sealable materials, so long as stress crack resistance is not a critical factor, considering the product to be contained. Thus Example 1 shows LDPE. Illustrative of other acceptable materials useful for that layer are MDPE, HDPE, EVA, Surlyn, ethylene methacrylic acid. These materials would, of course have to be compatible for heat sealing to the other surface layer to form the tube lap seal.

Thus it is seen that the invention provides multiple layer sheet structure, and tubes made therefrom, having improved stress crack resistance over some prior art structures, and equivalent stress crack resistance and better resistance to generation of polydust than others. In some embodiments, the invention provides improved resistance to shock abuse.

Having thus described the invention, what is claimed is:

1. A multiple layer sheet structure wherein the layers are firmly adhered to each other to make a unitary structure, in order:
    (a) an exterior heat sealable layer;
    (b) a first adhesive layer;
    (c) a barrier layer;
    (d) a second adhesive layer;
    (e) an OPP layer; and
    (f) a polyethylene layer;
    said second adhesive layer and said polyethylene layer, acting in an adhesive capacity, being effective collectively, to join said OPP layer into the structure with good adhesion.

2. A multiple layer sheet structure, wherein the layers are firmly adhered to each other to make a unitary structure, the layers comprising, in order:
    (a) a layer of LLDPE;
    (b) a first adhesive layer;
    (c) a metal foil layer;
    (d) a second adhesive layer; and
    (e) a polyethylene layer.

3. A multiple layer sheet structure as in claim 1 wherein a major component of said heat sealable layer comprises LLDPE.

4. A sheet structure as in claim 3 and further including additional layers on said polyethylene layer, said additional layers comprising, in order:
    a paper layer;
    a second polyethylene layer; and
    an polyethylene exterior layer, said polyethylene exterior layer being bonded to said second polyethylene layer with good adhesion.

5. A sheet structure as in claim 1 or 3 wherein said second adhesive layer and said polyethylene layer each contain EMA copolymer as a blend component up to about 100%.

6. A sheet structure as in claim 1 or 3 wherein the adhesion between said OPP layer and the adjacent layers is at least about 54 grams per inch.

7. A sheet structure as in claim 5 having adhesion between said OPP layer and the adjacent layers of at least about 54 grams per inch.

8. A sheet structure as in claim 6 wherein said adhesion is at least about 167 grams per inch.

9. A multiple layer sheet structure of claim 2 wherein the same defines a package having an exterior and an interior, and for receiving a product adjacent the interior, wherein the interior layer next to a product is said layer (a), followed by consecutive said layers (b), (c), (d), and said layer (e) as the exterior layer; and further including a third adhesive layer disposed between layers (d) and (e).

10. The multiple layer sheet structure of claim 9 further including a paper layer between the said third adhesive layer and said layer (e).

11. The multiple layer sheet structure of claim 2 wherein the structure defines a dispensing tube including an interior within which a product is received and an exterior, wherein layer (a) is the interior layer adjacent the product received in the tube, followed by consecutive said layers (b), (c), and (d), and layer (e) as the exterior layer; a third adhesive layer between said layers (d) and (e); and wherein
said adhesive layers (b) and (d) are EAA; and said third adhesive layer is LDPE.

12. The multiple layer sheet structure of claim 11 further including a paper layer between said third adhesive layer and said layer (e).

13. A flexible dispensing tube made of multiple layer sheet material wherein the layers are firmly adhered to each other to make a unitary structure, said sheet material comprising consecutive layers of, in order:
(a) a first heat sealable polymer layer;
(b) a first adhesive layer;
(c) a metal foil layer;
(d) a second adhesive layer;
(e) an OPP layer;
(f) a third adhesive layer;
(g) a paper layer; and
(h) a second heat sealable polymer layer of low density polyethylene or linear low density polyethylene.

14. A tube as in claim 13 wherein said first heat sealable polymer layer is LLDPE.

15. A tube as in claim 13 wherein said first heat sealable polymer layer is EAA.

16. A tube as in claim 13, 14 or 15 including an additional polyethylene layer between said paper layer and said second heat sealable layer.

17. A tube as in claim 13 wherein said second and third adhesive layers contain ethylene methyl acrylate copolymer as a blend component, up to about 100%.

18. A tube as in claim 17 having adhesion between said OPP layer and the adjacent layers of at least about 54 grams per inch.

19. A tube as in claim 13 having adhesion between said OPP layer and the adjacent layers of at least about 54 grams per inch.

20. A tube as in claim 19 having adhesion between said OPP layer and the adjacent layers of at least about 167 grams per inch.

* * * * *

UNITED STATES PATENT AND TRADEMARK OFFICE
CERTIFICATE OF CORRECTION

PATENT NO. : 4,551,371
DATED : November 5, 1985
INVENTOR(S) : John P. Eckstein

It is certified that error appears in the above-identified patent and that said Letters Patent is hereby corrected as shown below:

Column 5, line 37, delete "and", insert --wherein the product may effectively reduce the interfacial adhesion between layers 30 and 32. The product--;

Column 5, line 37, after "may" insert --also--.

Column 6, line 41, change "LLDPE" to read --LDPE--.

Table 1, heading of last section of middle column, change "Prior Art A-1" to read --A-1--.

Signed and Sealed this

Twenty-eighth Day of June, 1988

Attest:

DONALD J. QUIGG

Attesting Officer

Commissioner of Patents and Trademarks